United States Patent [19]

Buch

[11] Patent Number: 4,611,908

[45] Date of Patent: Sep. 16, 1986

[54] APPARATUS AND METHOD FOR FORMING REPRODUCTIONS WITH DESIRED MARGIN AREAS

[75] Inventor: Donald C. Buch, Penfield, N.Y.

[73] Assignee: Eastman Kodak Company, Rochester, N.Y.

[21] Appl. No.: 686,112

[22] Filed: Dec. 24, 1984

[51] Int. Cl.[4] .............................................. G03B 27/52

[52] U.S. Cl. .................................... 355/55; 355/14 C

[58] Field of Search .............. 355/55, 57, 29, 5, 3 ER, 355/14 C

[56] References Cited

U.S. PATENT DOCUMENTS

| | | |
|---|---|---|
| 3,618,032 | 11/1971 | Goldsberry . |
| 3,872,462 | 3/1975 | Lemelson . |
| 3,947,190 | 3/1976 | Otubo et al. . |
| 3,967,896 | 7/1976 | Looney et al. . |
| 4,080,058 | 3/1978 | Stephany et al. . |
| 4,156,238 | 5/1979 | Glasson . |
| 4,174,175 | 11/1979 | DiMaria . |
| 4,187,024 | 2/1980 | Satomi et al. . |
| 4,268,159 | 5/1981 | Tashiro . |
| 4,501,490 | 2/1985 | Miyamoto et al. . |

FOREIGN PATENT DOCUMENTS

| | | |
|---|---|---|
| 3422358 | 12/1984 | Fed. Rep. of Germany . |

OTHER PUBLICATIONS

Xerox 9900 Sales Guide.
Xerox 9900 News Release, Mar. 6, 1984.

*Primary Examiner*—Monroe H. Hayes
*Attorney, Agent, or Firm*—Norman Rushefsky

[57] ABSTRACT

In combination with a printer, such as an electrophotographic copier, a display is provided that is programmed to provide an image of the format of a copy sheet selected to receive the copied image of a document. Means are provided to adjust the display to allow the operator to adjust a viewable delineation between an image area and a margin area on the display. Also on the display is an indication of which portion of the margin area will be hidden when the copy sheet is bound into, for example, a stapled set. Adjustments to the display are used in adjusting the timing of a flash exposure of the document on a photoconductor. After development of the image on the photoconductor, the image is transferred onto a copy sheet of the format size selected. The image on the copy sheet will be formed on the copy sheet in accordance with the margin adjustments made on the display. In a preferred embodiment, the display simultaneously illustrates both sides of a copy sheet format. The illustration shows a portion of the front side and a portion of the back side; the latter appearing as a fold in front of the former.

15 Claims, 6 Drawing Figures

APPARATUS AND METHOD FOR FORMING REPRODUCTIONS WITH DESIRED MARGIN AREAS

BACKGROUND OF THE INVENTION

1. Field of the Invention

This invention relates to apparatus and method for reproducing documents or information on copy sheets and to an improved method and apparatus for adjusting the margin areas on the copy sheets using a display device.

2. Description of the Prior Art

In known electrophotographic reproduction apparatus, such as copiers or duplicators, an electrostatic image of a document is formed on a photoconductor, the image is then developed with electroscopic toner particles and in the case of plain paper copiers and duplicators the developed image is subsequently transferred to a paper receiver sheet, upon which the copied image is to appear. Thereafter, the photoconductor is cleaned and otherwise made ready for the next copy cycle.

In the case of so-called "optical" copiers or duplicators, the image is exposed onto a moving photoconductor using a high-intensity short-duration flash exposure. In certain known copiers or duplicators, the time at which the exposure occurs may be modified by the operator to slightly adjust the position of the image upon the photoconductor. After transfer of the developed image onto the paper or copy sheet in a timed relationship to movement of the photoconductor, the image will be located on the copy sheet in accordance with the adjustment made. This adjustment will thus provide the operator with some flexibility in determining how big the margins are to be on the copy sheet. The size of the margins is important in ensuring readability of a copy sheet that is to collected with others into a bound copy set. The binding of the copy sheets along one edge requires that image information be located sufficiently far from the margin to ensure that all information can be seen when reading the copy set. Since many original documents are made with "justifying" of only the left margin, reproductions of these documents by a copier or duplicator operating in a duplex mode is likely to require adjustment of the margin of at least the backside of a copy sheet to ensure information is not concealed when the copy sheet is bound. Copiers or duplicators providing margin shifting features are known, for example see U.S. Pat. No. 3,967,896, but they provide only a control which would require the making of proof copies in a trial and error approach by the operator to see what the amount of the adjustment of a control knob has done to change margin size. The invention is therefore directed to the problem of adjusting margin size on a copy sheet produced by a reproduction apparatus and facilitating an operator's working adjustment of margin shifting controls.

SUMMARY OF THE INVENTION

The invention pertains to an improved apparatus and method for reproducing documents using a display for determining margin sizes in reproductions. The display enables an operator to see what the margins are with a particular apparatus setting without having to make a proof copy. The display indicates a delineation between an image area and a margin area corresponding to that which will be used in the binding of the reproductions.

Means is provided for inputting information about a desired margin size. In response to this input, adjustment is made to the display to change the delineation between the image area and the margin area. In response to the inputting of information regarding desired margin size, adjustments are made by the apparatus to produce reproductions of the document having the desired margin size for facilitating reading of the reproductions when they are bound or stapled into copy sets.

BRIEF DESCRIPTION OF THE DRAWINGS

In the detailed description of the preferred embodiment of the apparatus and method of the invention, reference is made to the accompanying drawings, in which.

DESCRIPTION OF THE PREFERRED EMBODIMENT

Because apparatus of the type described herein are well known, the present description will be directed in particular to elements forming part of or cooperating more directly with the present invention. Since the invention has particular utility with regard to a copier/-duplicator, discussion will first be provided of an exemplary copier to illustrate the environment in which the apparatus and method of the invention may be used. Thereafter, discussion will be provided of the preferred embodiments of the invention.

Figure 1:
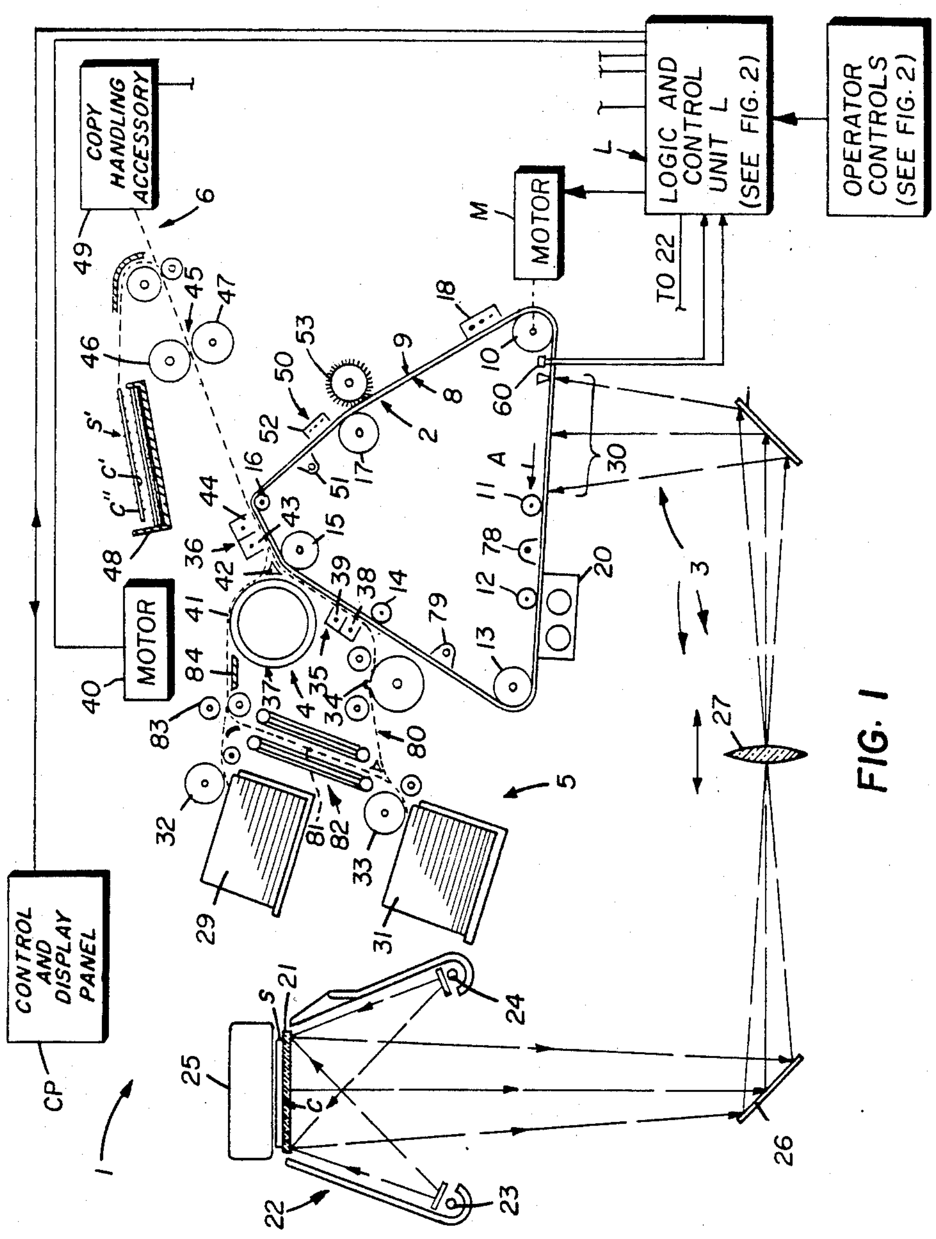
FIG. 1 is a schematic representation of a copier/duplicator apparatus in combination with which the apparatus and method of the invention may be used.

With reference now to FIG. 1, an electrophotographic copier/duplicator apparatus 1 includes a closed loop, flexible image transfer member, or photoconductive web 2 comprising a transparent support 8 and a photoconductor 9 backed by a grounded conductive layer (not shown). The web is trained about rollers 10–17. For more specific disclosures of the web, see commonly assigned U.S. Pat. Nos. 3,615,406 and 3,615,414, both issued Oct. 26, 1971. The rollers are mounted on the copier frame (not shown) with one of the rollers, roller 10, rotatively driven by a motor M to effect continuous movement of the web 2 in a clockwise direction (indicated by arrow A) about its closed loop path. The web has a plurality of sequentially spaced, nonoverlapping image areas which pass successively through electrophotographic processing stations (charge, expose, develop, transfer, clean) located about the path of the web. The web also includes timing marks (or regularly spaced perforations) which are sensed by appropriate means, such as timing signal generator 60 to produce timing signals. Such signals are sent to a logic and control unit L, which includes one or more microprocessors such as a model 8085 microprocessor available from Intel Corp. of Santa Ana, California. The unit L controls the entire electrophotographic process based on the instantaneous location of the web in the travel path.

An original document S to be reproduced is located, image side down, on a transparent glass platen 21 supported by the copier frame. A recirculating feeder 25 may be positioned on the top of platen 21 and may for example take the form of that disclosed in U.S. Pat. No. RE 27,976 wherein a plurality of original documents having images only on first sides thereof are repeatedly fed in succession from a supply stack to the exposure platen 21 of apparatus 1. The feeder may also take the form of that disclosed in Research Disclosure Bulletin Vol. 156, April 1977, Item 15671, wherein original documents having images on both sides thereof are repeatedly fed in order to the exposure platen with alternate sides of each sheet being presented to platen 21.

In either case, feeder 25 places a selected side C of a sheet of an original document S with side C facing platen 21. An edge of the document will be registered against a suitable stop on the platen and the operator will center the document using a suitable centering indicator. An image forming means 3 comprises an illumination source 22 that includes exposure lamps, such as zenon flash lamps 23, 24, which are located beneath the platen 21. When energized, the lamps flood side C of the document with light of relatively short duration and of high intensity and a reflected image of the document is transmitted via mirror 26, lens 27, and mirror 28 in focus to an exposure area 30 lying in the plane of the photoconductor 9. The original document could, of course, be a transparency illuminated from the back side thereof. The timing of the flash of lamps 23, 24 is controlled by the logic and control unit L and related to the travel of the photoconductor 9 to cause one of six predetermined areas on the photoconductor to receive an image exposure. One or more corona charging units, exemplified by corona charger 18, is located upstream of the exposure area 30, and applies a uniform electrostatic charge, of say negative polarity, to the photoconductor 9 as it passes the charger and before it enters the exposure area. The photoconductive properties of the web cause the uniform charge in the exposed areas of the web to be discharged in that portion struck by the exposure light. This forms latent imagewise charge patterns on the web in the exposed areas corresponding to the respective image on the original document. Travel of the web then brings the area bearing the latent image into a development station 20.

At the development station 20 the moving electrostatic image is contacted with finely divided charged toner particles that adhere to the charged web surface in a configuration defined by the electrostatic image, to form a visible toner image. This is accomplished by providing magnetic brush development rollers which rotate in a housing containing a supply of developer comprising a mixture of toner and magnetic carrier particles. The developer station can be constructed according to any one of a variety of designs known in the prior art. One such design is shown in commonly assigned U.S. Pat. No. 3,543,720 issued Dec. 1, 1970, in the names of Drexler et al. For a specific example of such a developer, see commonly assigned U.S. Pat. No. 3,893,935, issued July 8, 1975 to Jadwin et al.

A transfer station is provided in which the toner image is transferred to a receiving surface of a copy sheet S′ on which it can be subsequently permanently fused.

Copy sheet input section 5 includes supplies 29 and 31 of copy sheets S′ of any suitable material such as paper, transparencies or the like. Copy sheets S′ are supplied from the top of either supply 29 or supply 31 by means of oscillating vacuum rollers 32, 33 respectively. When apparatus 1 is operating in the duplex mode, copy sheets S′ are supplied from supply 31 along path 80 to registration mechanism 34 which registers the first side of copy sheet S′ with the first toned image on web 2 at the first transfer station 35 and synchronizes the movement of copy sheets S′ with web 2. When apparatus 1 is operating in the simplex mode, copy sheets S′ are supplied from supply 31 along path 81 by transport belts 82 to nip rollers 83 and thence over guide 84 to vacuum drum means 37 or from supply 29 to nip rollers 83 and thence to vacuum drum means 37.

When apparatus 1 is operating in the duplex mode, image forming means 3 and development station 20 form first and second transferable toner images on web 2. Copy sheet duplexing/simplexing station 4 is provided to effect transfer of the toner images to copy sheets and includes first and second image transfer stations 35 and 36 and vacuum drum means 37 located adjacent to web 2 between transfer stations 35 and 36.

First transfer station 35 may include a first transfer corona charger 38 which has a negative DC potential applied to its corona wire and a first detack charger 39 which has an AC potential applied to its corona wire. Registration mechanism 34 registers a copy sheet S′ with the first toner image formed on web 2 at first transfer station 35 where first transfer charger 38 impresses a negative charge on sheet S′ to cause the positively charged first toner image to be transferred from member 2 to a first side C′ of sheet S′. Detack charger 39 neutralizes the negative charge on copy sheet S′ so that it can be easily separated from web 2.

Vacuum drum means 37 is rotatable in first and second opposite directions by means of motor 40. In the duplex mode, drum means 37 is rotated in a first direction to separate by vacuum attraction a copy sheet S′ from web 2 after the first toner image has been transferred to a first side C′ of copy sheet S′ at transfer station 35 and to move the sheet along sheet turnaround path 41. Drum means 37 is then rotated in a second direction after copy sheet S′ has been separated from web 2, to invert sheet S′ while the first toner image on side C′ is unfixed and to assist in registering the second or opposite side C″ of copy sheet S′ with the second toner image on web 2 at second transfer station 36. At station 36, the second image is transferred to side C″ of sheet S′. Copy sheet diverter 42 removes the copy sheet from drum means 37 and guides it into transfer relation with the second image on web 2 at second transfer station 36.

Second transfer station 36 is similar to first transfer station 35 and includes second transfer corona charger 43 and second detack charger 44. Second transfer charger 43 impresses a negative charge on a sheet S′ to transfer a second toner image from web 2 to side C″ of sheet S′ and second detack charger 44 neutralizes any charge remaining on sheet S′ so that it may be easily separated from web 2.

After transfer of both toner images to sheet S′ it is separated from web 2 and directed to output station 6 which includes a fixing means 45 for fixing the unfixed toner images to copy sheet S′. As shown, fixing means 45 may be a roller fuser including heated rollers 46 and 47 for heating and fusing the toner particles to sheet S′ to form a final copy. Sheet S′ may then be transported to an output tray 48 or to a known copy handling accessory 49 such as the finisher disclosed in Research Disclosure Bulletin Vol. 167, March 1978, Item 16731, which effects straight or offset stacking and stapling of copy sheets or sets of copy sheets; the contents of which are incorporated in this specification.

Apparatus 1 may be operated in a simplex mode wherein only first images are formed on web 2 and transferred to first sides of copy sheets S'. In such case, as described above, a copy sheet is supplied from either of supplies 29 or 31 to vacuum drum means 37 by nip rollers 83. Vacuum drum means 37 is rotated in the second (clockwise) direction to direct the first side of a copy sheet S' into registration with the first image on web 2 at second transfer station 36 where the first image is transferred to the copy sheet. Either rollers 83 or drum means 37 may be used to register copy sheet S' with the simplex image on web 2. Thereafter the image is fixed by fixing means 45 to produce a final copy which is transported to tray 48 or accessory 49.

A cleaning station 50 is provided to effect mechanical and electrical cleaning of photoconductor 9 of web 2. Station 50 includes a cleaning assist erase lamp 51 which exposes the photoconductor to radiation to reduce more of the charge remaining from the transfer and detack steps; a cleaning assist charger 52 which impresses an AC charge on the surface of photoconductor 9 of web 2 to neutralize the charges on untransferred toner particles; and a brush 53 which removes any residual toner from the surface of photoconductor 9 and deposits it in a suitable collection container (not shown).

Apparatus 1 may also include an interframe erase lamp(s) 78 and a post-development erase lamp(s) 79 to reduce photoconductor fatigue.

For a more complete description of the general organization of a similar copier apparatus, reference may be made to commonly assigned U.S. Pat. No. 4,191,465, issued Mar. 4, 1980 to Boase et al, the contents of which are incorporated by this reference.

Although a web-type copier/duplicator has been shown, it will be understood that the present invention is also particularly suitable with copier/duplicator (or printer) apparatus that use drums and also sheet film photoconductors. In any case, it will be understood by those skilled in the art that a microcomputer having a stored program and with inputs provided by an operator through a control panel can be effectively used as the logic and control apparatus to control the operation of the copier/duplicator. One such microcomputer is disclosed in the above-referenced U.S. Pat. No. 4,025,186 issued May 24, 1977 to Hunt et al.

Figure 2:
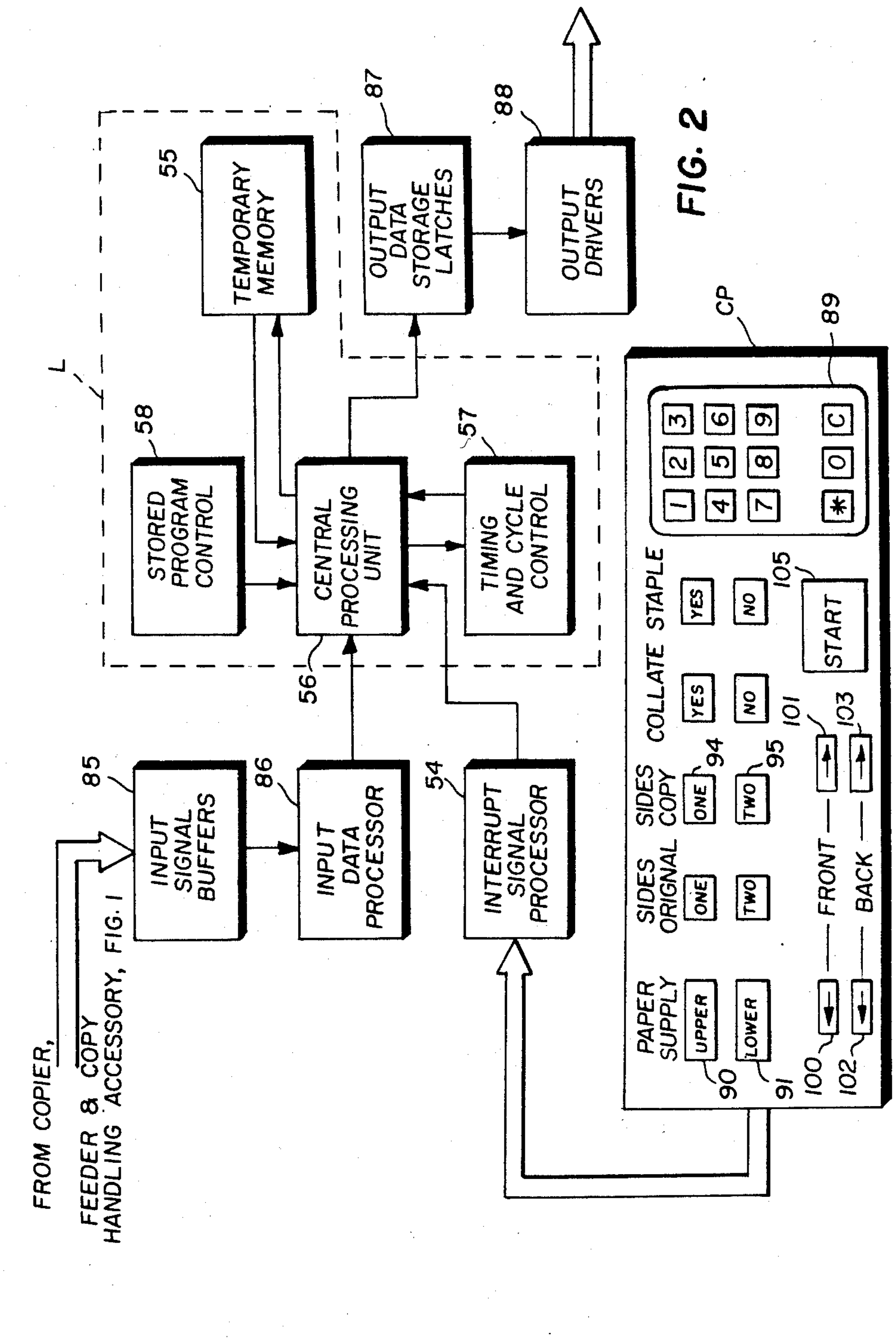
FIG. 2 is a schematic of a circuit which comprises a preferred embodiment of the apparatus of the invention.

Turning now to FIG. 2, a block diagram of logic and control unit L is shown which interfaces with the copier 1. The unit L consists of temporary data storage memory 55, central processing unit 56, timing and cycle control unit 57, and stored program control 58. Data input and output is performed sequentially under program control. Input data signals are applied either through input signal buffers 85 to an input data processor 86 or to interrupt signal processor 54. The input signals are derived from various switches, sensors, and analog-to-digital converters. The output data and control signals are applied to storage latches 87 which provode inputs to suitable output drivers 88, directly coupled to leads. These leads are connected to the copier apparatus' work stations and to a display device 61 such as a cathode ray tube (CRT) or LED array bank preferably forming a part of or located proximate to an operator's control panel, CP. Interrupt signals are provided by buttons located on the control panel (CP). On this control panel, for each copying job, the operator may program the unit L to indicate which copy sheet supply is desired (buttoms 90, 91). This will indicate format since the copier may have been programmed as to what size sheets are in the copy sheet supplies or may be provided with means for sensing the size of copy sheets by the inserted cartridges containing the copy sheets or by sensing size of copy sheets directly. Next the operator will indicate using buttons 94, 95 whether the copying is to be on one or two sides (simplex or duplex). Using a keyboard 89 the operator can input the number of copies to be made and by using the star (*) button on the keyboard in conjunction with a predetermined code indicate that a certain stored program allowing inputted margin control for copies of one or more document sheets is desired. When this information is provided, the stored program within the unit L will actuate the output deivers 88 to provide a picture on a display device that is either similar to that shown in FIG. 3*a* or in FIG. 3*b* depending upon whether duplex or simplex copying has been requested.

Figure 3A:
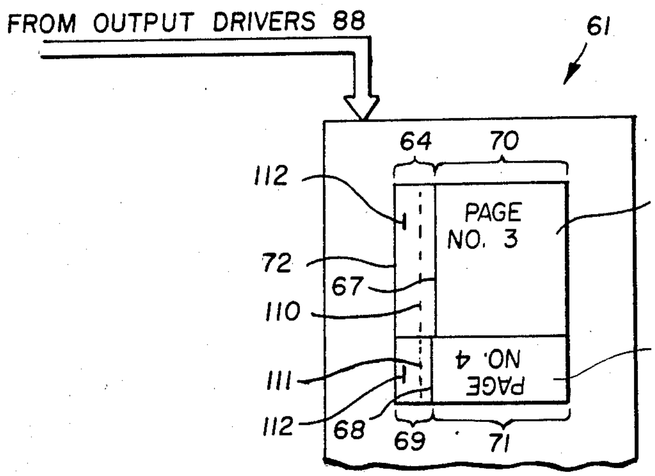
FIG. 3*a*, 3*b* and 3*c* are schematics of a display that is provided using the apparatus and method of the invention.
Figure 4:
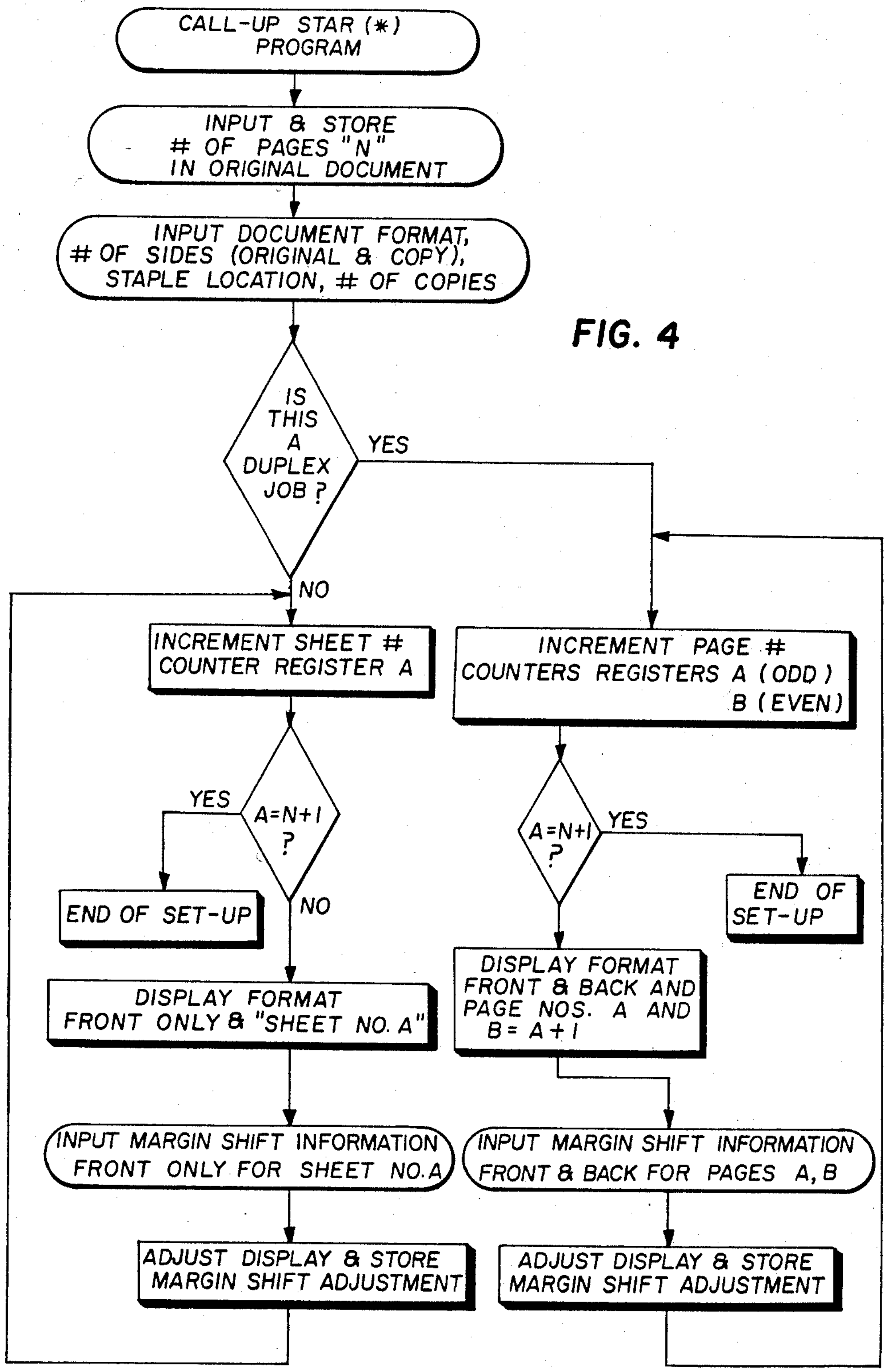
FIG. 4 is a flow chart for a program for a computer that is useful in practicing the invention.

With reference now to FIG. 3*a* and FIG. 4, the display device 61 is shown illustrating a copy sheet 63 having the same proportions of that selected by pressing either button 90 or 91. A portion of side two 66 is also illustrated in the display. The image of side two appears as if part of side two is folded-up from the bottom in front of the bottom portion of side one. This display advantageously shows both sides of the copy sheet simultaneously using a substantial portion of the width dimension of the screen to illustrate each side of the copy sheet. This is preferred over an alternative of illustrating side one and side two in side-by-side relation since the width of each could only take up no more than one half of the display screen. Full vertical lines 67 and 68 are illustrated in the display to indicate a delineation between a margin portion 64, 69, respectively, on each side of the display copy sheet and a text portion 70, 71, respectively, illustrated as being to the right of the lines 67, 68. Initially, the positions of these full vertical lines 67 and 68 are pre-programmed to be a specific predetermined distance from the edge 72, such as 1½ inches (3.8 cm) where the display width of the copy sheet is the same size as the actual copy sheet selected. Each depression of button 100 will provide a pulse to the logic and control unit L and this unit will cause the display to be changed by in effect causing the movement of the line 67 to the left a fixed amount for each pulse so generated from depression of button 100. Similarly, each depression of button 101 causes a pulse to be generated and results in apparent movement of the line 67 to the right one increment from its last position. The increment will be preprogrammed into the stored program control 36 and could comprise 0.1" times a factor relating the size of the image width on the screen divided by the format width. In the example provided above where these widths are the same the factor is equal to one. This will maintain the proportional relationship between viewed image margin and actual image margin and allow for 0.1" margin shifts in the appropriate directions for each depression of buttoms 100, 101. Buttons 102, 103 operate in a similar manner to move line 68 relative to its respective margin edge 72. The logic and control unit may also be programmed to display an illustration of one or more staples 112 if indication is provided to the copier to produce stapled finished sets of copies. The logic and control unit may be pre-programmed to provide the illustrated staples 112 at predetermined distances from the left edge 72 and top edge of the copy sheet display 63 with the staples being a predetermined distance apart. Where the copier includes a finisher such as accessory 49 the arrangement of the stapling apparatus provided by the finisher may be used to determine where the staples are illustrated in the display 63. That is, information concerning staple location may be pre-programmed or alternatively sensed directly from the position of the staple applying means by suitable sensors and inputted into the logic and control unit through the input signal buffers 85.

The vertical lines 110, 111 shown by dashes indicate respectively that portion of the margin area that is hidden when the pages are bound by the staples placed in the location shown. If the set is to be stapled as shown the operator in making adjustments on the display will make sure that lines 67, 68 are not adjusted to the left of lines 110, 111. The placement of the dashed vertical lines 110, 111 may be determined as being a fixed distance to the right from the position of the staples 112.

With each adjustment by the operator of the position of the desired location of the margins on each side of the displayed copy sheet this information, in addition to being displayed, is stored in the logic unit's temporary memory unit 55 to control margin size for the particular sheet.

Margin sizes for each copy sheet in a multisheet document may be preprogrammed into the logic unit's memory 55 by programming the position of the sheet in the document stack and assigning a desired margin size using the display means described with regard to FIGS. 2 and 3.

As shown in FIG. 3*a* and with reference to the flow chart in FIG. 4, the program can be provided to display the page number of each page being considered for margin adjustment. When the margin adjustment for each page is stored in memory, the page number associated with the adjustment is also stored in memory so that when the copier begins making copies, upon actuation of button 105, of the multisheet document the timing of the discharge of the flash lamps 23, 24 vis-a-vis a respective image frame will be automatically adjusted by the Logic and Control Unit in response to the adjustments stored in memory for each side of each document. The program may be such that only changes from the normal margin size for that format is stored in memory and that where no adjustments from the standard are to be made the discharge of the flash lamps is controlled with a normal programming sequence based on the position of an image frame as sensed by timing signal generator 60. In all cases, transfer to the receiver sheet of a developed image that is formed on an image frame of the photoconductor is synchronized with the image frame so that the position of the image transferred to the receiver sheet will vary depending upon adjustments in the time of exposure vis-a-vis position of the image frame as the image frame crosses the image path.

Another advantage of illustrating both sides of the copy sheet as shown in FIG. 3*a* is that the display can be made the actual width of the copy sheet format selected. Where the size of the document sheet is the same as the copy sheet, the operator can hold the sheet up to the display and compare the actual margin area with the displayed margin delineation to determine if margin adjustment is necessary and to what extent. If the original is not too opaque and the display is sufficiently bright, the operator may hold the original over the display and view the adjustment through back lighting by the display to see if actual text on the document sheet will be in the hidden margin area or not. Adjustments may then be made to flash timing to adjust margin size so that image information is not hidden when the copy sheets are bound into copy sets. When the operator wishes the copy sheet to have identical margins with the original, the operator can hold the original up to the display matching the left edge of the original with the left edge 72 of the page format displayed and adjust the vertical lines 67, 68 so they match the appropriate margin of the text on the original.

Figure 3B:
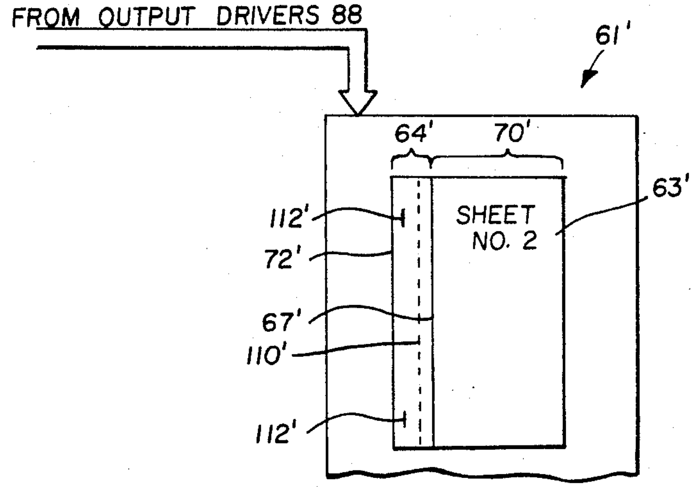

FIG. 3*b* shows a display illustrating just the front of the format of a selected copy sheet. Similar details to that of the display shown in FIG. 3*a* are indicated by a prime and the operation of the apparatus with the use of this display is similar to that described above.

Figure 3C:
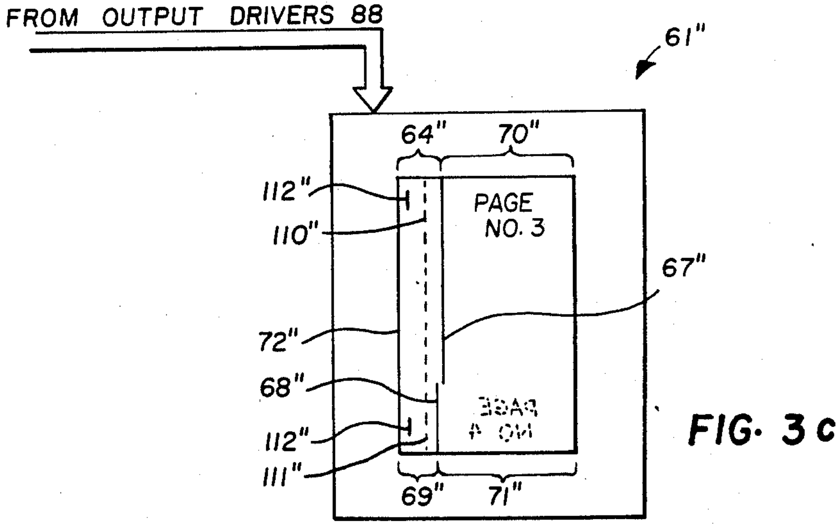

FIG. 3*c* shows a display illustrating both the front and back of a format of a selected copy sheet. In this illustration the details of subject matter concerning the back side of the sheet are illustrated as if the sheet is transparent. Items indicated by a double prime (") in this figure have similar functions to that illustrated in FIG. 3*a*.

Modifications may include the use of transparent electronic displays where the original can be placed behind the displays and the indicia such as format outline, lines 67, 68 and lines 110, 111 as well as page number indicia are opaque.

Still further modifications may comprise the use of an LED bank display or liquid crystal display which is used on copiers primarily for providing one line of messages or instructions to the operator. These displays can be made long enough to be of a dimension at least equal to the largest width copies to be made on the copier apparatus. The displays can be programmed to provide short vertical lines that indicate a left edge of a sheet (72), a line equivalent in function to line 110 and a line equivalent in function to line 67. The original document can be held up adjacent to this display and adjustments made as described above.

While the above discussion of the preferred embodiment has been directed primarily to an optical copier, the invention may also be utilized with electronic copier apparatus wherein information electronically stored is reproduced through exposure of a photosensitive element, such as a photoconductor, by a laser beam or light emitting diode array that is modulated by the stored information. The invention also may find utility with regard to word processing apparatus with printout directly onto a nonphotosensitive copy sheet. In both of these apparatus, the actual image information may be displayed on the illustrated copy sheet 63' and the operator can adjust margins accordingly using the dashed vertical lines 110' in FIG. 3*b* as a guide to ensure that image information does not move into an area that may be hidden when the copy sheet is bound into a stapled set. As the actual image information is being displayed the left margin of the image information can be used as a substitute for the line 67' or a cursor may also be conveniently used to represent line 67'. Adjustment of the left margin may be made by a pulse-generating means as described herein for the optical copier or by having the display be a touch-sensitive screen so that movement of the left margin of the image is made to a position indicated by an operator's touch directly on the display.

The invention has been described in detail with particular reference to a preferred embodiment thereof but it will be understood that variations and modifications can be effected within the spirit and scope of the invention.

I claim:

1. In combination with an apparatus for reproducing documents having image information onto an intermediate member and means for transferring the image information from the intermediate member onto copy sheet reproductions, the reproductions of the documents each having an image area and a margin area; memory means for storing information inputted therein relative to desired adjustment of margin size on the copy sheet reproductions; control means responsive to said memory means for adjusting said apparatus to produce reproductions of a document having desired margin sizes for facilitating reading of the reproductions when they are bound or stapled into copy sets; display means; means for illustrating on said display means indicia illustrating thereon a delineation between an image area and a margin area;

adjusting means for providing signals for adjusting said display means to visually change the delineation between said image area and said margin area in response to said information input into said memory means; and the improvement which comprises:

wherein the means for illustrating indicates a portion of said margin area on a copy sheet that will be hidden when the copy sheets are bound along said margin area.

2. The combination of claim 1 and wherein the means for illustrating provides a picture of at least a portion of a copy sheet showing both front and back sides of a copy sheet and illustrates for both sides of said copy sheet a delineation between the image area and said margin area; and wherein the adjusting means includes means for independently adjusting the delineation between said image area and said margin area for each side of said picture in response to information inputted into said adjusting means.

3. The combination of claim 2 and wherein the means for illustrating provides a picture showing a portion of a front side of the copy sheet and the back side is illustrated as a portion folded in front of said front side.

4. In combination with an apparatus for producing finished sets of reproductions of a multipage document the apparatus including means for imaging image information on original documents onto an intermediate member and means for transferring the image information from the intermediate member onto copy sheet reproductions, the reproductions in each set comprising pages each having an image area and a margin area that is used for binding the reproductions to each other to form the finished set; memory means for storing information; means for inputting information into said memory means about desired margin size; control means responsive to information input regarding desired margin size for adjusting said copier to produce reproductions of said document having a desired margin size for facilitating reading of the reproductions; display means;

means for illustrating on said display means indicia illustrating a delineation between an image area and a margin area;

adjusting means for adjusting said display to visually adjust the delineation between said image area and said margin area in response to said information input into said memory means; and the improvement which comprises:

wherein the means for illustrating provides a picture of a copy sheet, the picture showing a portion of a front side of the copy sheet and the back side being illustrated as a portion folded in front of said front side.

5. The combination of claim 4 and wherein the means for illustrating indicates a portion of the margin area on the copy sheet that will be hidden when the copy sheets are bound along said margin area.

6. In combination with an apparatus for producing finished sets of reproductions of a multipage document the apparatus including means for imaging image information on original documents onto an intermediate member and means for transferring the image information from the intermediate member onto copy sheet reproductions, the reproductions in each set comprising pages each having an image area and a margin area that is used for binding the reproductions to each other to form the finished set; pictorial display means;

means for illustrating on said pictorial display means at least a portion of a copy sheet illustrating a delineation between an image area and a margin area;

adjusting means for adjusting said display to adjust the delineation between said image area and said margin area in response to said information input into said memory means;

control means responsive to information input regarding desired margin size for adjusting said apparatus to produce reproductions of said document having a desired margin size; and the improvement which comprises:

wherein the means for illustrating indicates a portion of the margin area on a copy sheet that will be hidden when the copy sheets are bound along said margin area.

7. In combination with an apparatus for reproducing documents onto copy sheets, the reproductions of the documents each having an image area and a margin area that is used in the binding of the reproductions to each other; memory means for storing information; means for inputting information into said memory means about desired margin adjustments; control means responsive to information input regarding desired margin adjustments for adjusting said apparatus to produce reproductions of said document having desired margin sizes for facilitating reading of the reproductions when they are bound or stapled into copy sets; display means;

means for illustrating on said display means indicia illustrating thereon a delineation between an image area and a margin area;

adjusting means for providing signals for adjusting said display to visually change the delineation between said image area and said margin area in response to said information input into said memory means, wherein the means for illustrating provides a picture of at least a portion of a copy sheet showing both front and back sides of a copy sheet and illustrates for both sides of said copy sheet a delineation between the image area and the margin area; and wherein the adjusting means includes means for independently adjusting the delineation between said image area and said margin area for each side of said picture in response to information input into said adjusting means; and the improvement which comprises:

wherein the means for illustrating further indicates a portion of said margin area on the copy sheet that will be hidden when the copy sheets are bound along said margin area.

8. The combination of claim 7 and wherein the apparatus comprises electrophotographic reproduction apparatus including exposure means for imaging image information from the original documents onto one or more image areas on a moving intermediate member; means for transferring the image information from the intermediate member onto the reproductions; and control means for adjusting the commencement time of the exposure of image information of a document onto said image area in response to the signals used to adjust the display to thereby adjust the position of the image information of the document on the intermediate member.

9. A method for reproducing original documents onto copy sheets using a reproduction apparatus, the reproductions of the documents each having an image area and a margin area that is used in the binding of the reproductions to each other, the method including the steps of:

providing indicia on a pictorial display illustrating a copy sheet and indicating a delineation between an image area and a margin area and further indicating a portion of said margin area that will be hidden when the copy sheets are bound along said margin area;

adjusting the display to visually change the delineation between the image area and the margin area to provide a desired margin area size and;

adjusting the reproduction apparatus in response to inputs to adjust the display to produce reproductions of said document having a desired margin size for use in binding of the reproductions.

10. The method of claim 9 and wherein the illustration provided is that of a picture of at least a portion of a copy sheet showing both front and back sides of the copy sheet and illustrates for both sides of said copy sheet a delineation between the image area and the margin area used in the binding of the reproductions; and wherein in the adjusting step adjusting of the delineation between image area and margin area is made for each side of said picture.

11. The method of claim 10 and wherein the illustration provided shows a portion of the front side of the copy sheet and the back side is illustrated as a portion folded in front of said front side.

12. In combination with an apparatus for reproducing documents, the reproductions of the documents each having an image area and a margin area that is used in the binding of the reproductions to each other; memory means for storing information; input means for inputting information into said memory means about desired margin sizes; control means responsive to information input regarding desired margin size for adjusting said apparatus to produce reproductions of said document having a desired margin size for facilitating reading of the reproductions when they are bound or stapled into copy sets; display means; and the improvement which comprises:

means responsive to said input means for indicating on said display means a delineation between a visible area and a margin area corresponding respectively to that which will be visible and that which will be hidden when the reproductions are bound to each other 13. The combination of claim 12 and including means for adjusting said display in response to said input means to change a delineation indicated on said display between an image area and a margin area.

14. A method for reproducing original documents onto copy sheets using a reproduction apparatus storing different sizes of copy sheets, the reproductions of the documents each having an image area and a margin area that is used in the binding of the reproductions to each other, the method including the steps of:

generating a signal related to the size of the copy sheets selected for a production job;

in response to said signal providing indicia on a pictorial display illustrating, to scale for the copy sheet size selected, a copy sheet and indicating a delineation between an image area and a margin area;

adjusting the display to visually change the delineation between the image area and the margin area to provide a desired margin area size and;

adjusting the reproduction apparatus in response to inputs to adjust the display to produce reproductions of said document having a desired margin size for use in binding of the reproductions.

15. In combination with an apparatus for reproducing documents having image information onto an intermediate member and means for transferring the image information from the intermediate member onto copy sheet reproductions of a desired size, the reproductions of the documents each having an image area and a margin area; memory means for storing information inputted therein relative to desired adjustment of margin size on the copy sheet reproductions; control means responsive to said memory means for adjusting said apparatus to produce reproductions of a document having desired margin sizes for facilitating reading of the reproductions when they are bound or stapled into copy sets; display means; means for illustrating on said display means indicia illustrating thereon a delineation between an image area and a margin area;

adjusting means for providing signals for adjusting said display means to visually change the delineation between said image area and said margin area in response to said information input into said memory means; and the improvement which comprises:

wherein the memory means stores signal information relative to the size of a copy sheet selected for reproduction; and wherein the means for illustrating changes the display means in response to the signal information stored in the memory means regarding copy sheet size to change the illustration thereon to illustrate a copy sheet that is to scale to the copy sheet selected for reproduction.

* * * * *